United States Patent
Durant

(10) Patent No.: US 9,928,109 B2
(45) Date of Patent: Mar. 27, 2018

(54) METHOD AND SYSTEM FOR PROCESSING NESTED STREAM EVENTS

(75) Inventor: Luke Durant, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 247 days.

(21) Appl. No.: 13/467,804

(22) Filed: May 9, 2012

(65) Prior Publication Data
US 2013/0305258 A1 Nov. 14, 2013

(51) Int. Cl.
*G06F 9/48* (2006.01)
*G06F 9/54* (2006.01)

(52) U.S. Cl.
CPC ............ *G06F 9/4881* (2013.01); *G06F 9/542* (2013.01); *G06F 2209/484* (2013.01)

(58) Field of Classification Search
None
See application file for complete search history.

(56) References Cited

U.S. PATENT DOCUMENTS

| | | | |
|---|---|---|---|
| 7,350,208 B1 * | 3/2008 | Shoham | 718/102 |
| 7,362,772 B1 * | 4/2008 | Alfieri | H04L 45/00 370/429 |
| 7,536,690 B2 | 5/2009 | Alverson et al. | |
| 7,599,287 B2 | 10/2009 | Testa et al. | |
| 7,715,419 B2 | 5/2010 | Tatar et al. | |
| 8,051,425 B2 * | 11/2011 | Godman | G06F 9/5038 709/219 |
| 8,392,932 B2 * | 3/2013 | Kawamoto | 718/108 |
| 2006/0004760 A1 * | 1/2006 | Clift | G06F 17/30362 |
| 2008/0098207 A1 | 4/2008 | Reid et al. | |
| 2011/0067034 A1 | 3/2011 | Kawamoto | |
| 2012/0192194 A1 * | 7/2012 | Richardson | 718/103 |

FOREIGN PATENT DOCUMENTS

CN 102047224 A 5/2011

OTHER PUBLICATIONS

Cedric, Declaring dependencies with cudaStreamWaitEvent, Feb. 9, 2012, cedric-augonnet.com, pp. 1-5.*
CUDA 4.0 Readiness Tech Brief, Mar. 3, 2011, NVIDIA, pp. 1-10.*
Rob Farber, CUDA Application Design and Development, 2011, Elsevier, p. 159.*
Nvidia, The CUDA Compler Driver NVCC, Apr. 1, 2008, Nvidia, pp. 1-31.*
Aland, Instruction transfer between CPU and GPU, Stack Overflow, Feb. 28, 2012, pp. 1-2.*

(Continued)

*Primary Examiner* — Emerson Puente
*Assistant Examiner* — Zhi Chen
(74) *Attorney, Agent, or Firm* — Artegis Law Group, LLP

(57) ABSTRACT

One embodiment of the present disclosure sets forth a technique for enforcing cross stream dependencies in a parallel processing subsystem such as a graphics processing unit. The technique involves queuing waiting events to create cross stream dependencies and signaling events to indicated completion to the waiting events. A scheduler kernel examines a task status data structure from a corresponding stream and updates dependency counts for tasks and events within the stream. When each task dependency for a waiting event is satisfied, an associated task may execute.

23 Claims, 14 Drawing Sheets

(56) References Cited

OTHER PUBLICATIONS

Jason et al., CUDA by Example: An introduction to General-Purpose GPU programming, Jul. 19, 2010, Addison-Wesley Professional.*

HPC Advisory Council, Creative Consultants Taps InfinitBand to Deliver Efficient GPU-based HPC Cluster, HPC Advisory Council, 2009, pp. 1-2.*

NVIDIA, CUDA C Best Practices Guide, Jan. 2012, NVIDIA, p. 17.*

NVIDIA, NVIDIA CUDA Programming Guide, Apr. 16, 2012, NVIDIA, pp. 81-85.*

NVIDIA, CUDA Toolkit Reference Manual, Apr. 2012, NVIDIA, pp. 40 and 44.*

Johnson, Theodore, "A Concurrent Dynamic Task Graph," Int'l Conf. on Parallel Processing, 1993, pp. 14-21, University of Florida, Gainesville, FL, USA.

* cited by examiner

METHOD AND SYSTEM FOR PROCESSING NESTED STREAM EVENTS

BACKGROUND OF THE INVENTION

Field of the Invention

The present invention generally relates to multi-threaded computer architectures and, more specifically, to a method and system for processing nested stream events.

Description of the Related Art

In conventional computing systems having both a central processing unit (CPU) and a graphics processing unit (GPU), the CPU determines which specific computational tasks are performed by the GPU and in what order. A GPU computational task typically comprises highly parallel, highly similar operations across a parallel dataset, such as an image or set of images. In a conventional GPU execution model, the CPU initiates a particular computational task by selecting a corresponding thread program and instructing the GPU to execute a set of parallel instances of the thread program. In the conventional GPU execution model, only the CPU may initiate execution of a thread program on the GPU. After all thread instances complete execution, the GPU must notify the CPU and wait for another computational task to be issued by the CPU. Notifying the CPU and waiting for the next computational task is typically a blocking, serialized operation that leaves certain resources within the GPU temporarily idle, thereby reducing overall system performance.

Performance may be improved in certain scenarios by queuing sequential computational tasks in a pushbuffer, from which the GPU may pull work for execution without waiting for the CPU. Computational tasks that include fixed data-flow processing pipelines benefit from this pushbuffer model when the CPU is able to generate work for the GPU quickly enough to have work pending within the pushbuffer whenever the GPU is able to start a new task. However, data-dependent computational tasks are still left with a sequential dependence between GPU results, CPU task management, and subsequent GPU task execution, which must be launched by the CPU.

Multi-threaded computation models conventionally organize work into ordered streams of tasks that must complete in a defined order. In such computation models, execution semantics dictate that a given task must complete before a dependent task may execute. In a simple scenario, a serial dependence among an arbitrary sequence of tasks may be queued within a pushbuffer for efficient execution by the GPU. However, certain computation models allow for cross stream dependencies, whereby a task in one stream depends on two or more different tasks completing, potentially across two or more different streams. In such scenarios, the CPU schedules tasks to avoid deadlock. The process of waiting for certain tasks to complete before scheduling other tasks to avoid deadlock creates additional serial dependencies between the CPU and GPU task execution, reducing overall efficiency.

As the foregoing illustrates, what is needed in the art is a technique to enable more efficient and semantically complete GPU execution.

SUMMARY OF THE INVENTION

One embodiment of the present invention sets forth a computer-implemented method for processing a plurality of tasks across a group of threads, the method comprising retrieving a first item from a queue, determining that the first item does not comprise a task, determining whether the first item comprises a wait event or a signaling event; in response, decrementing a count, and removing the first item from the queue.

Other embodiments of the present invention include, without limitation, a computer-readable storage medium including instructions that, when executed by a processing unit, cause the processing unit to perform the techniques described herein as well as a computing device that includes a processing unit configured to perform the techniques described herein.

One advantage of the disclosed approach is that a GPU may correctly and efficiently enforce execution order in tasks having cross stream dependencies without intervention from a CPU.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
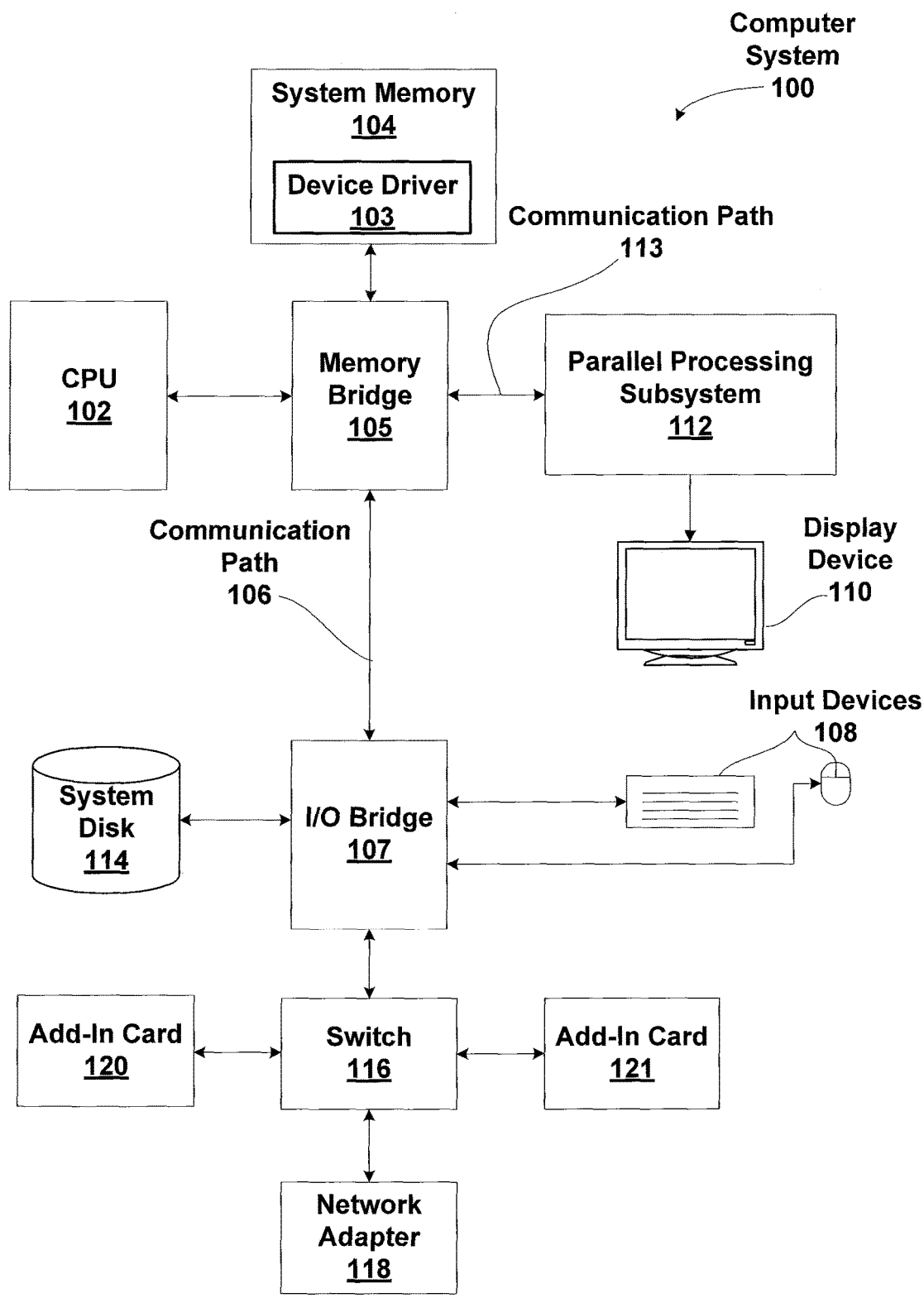
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
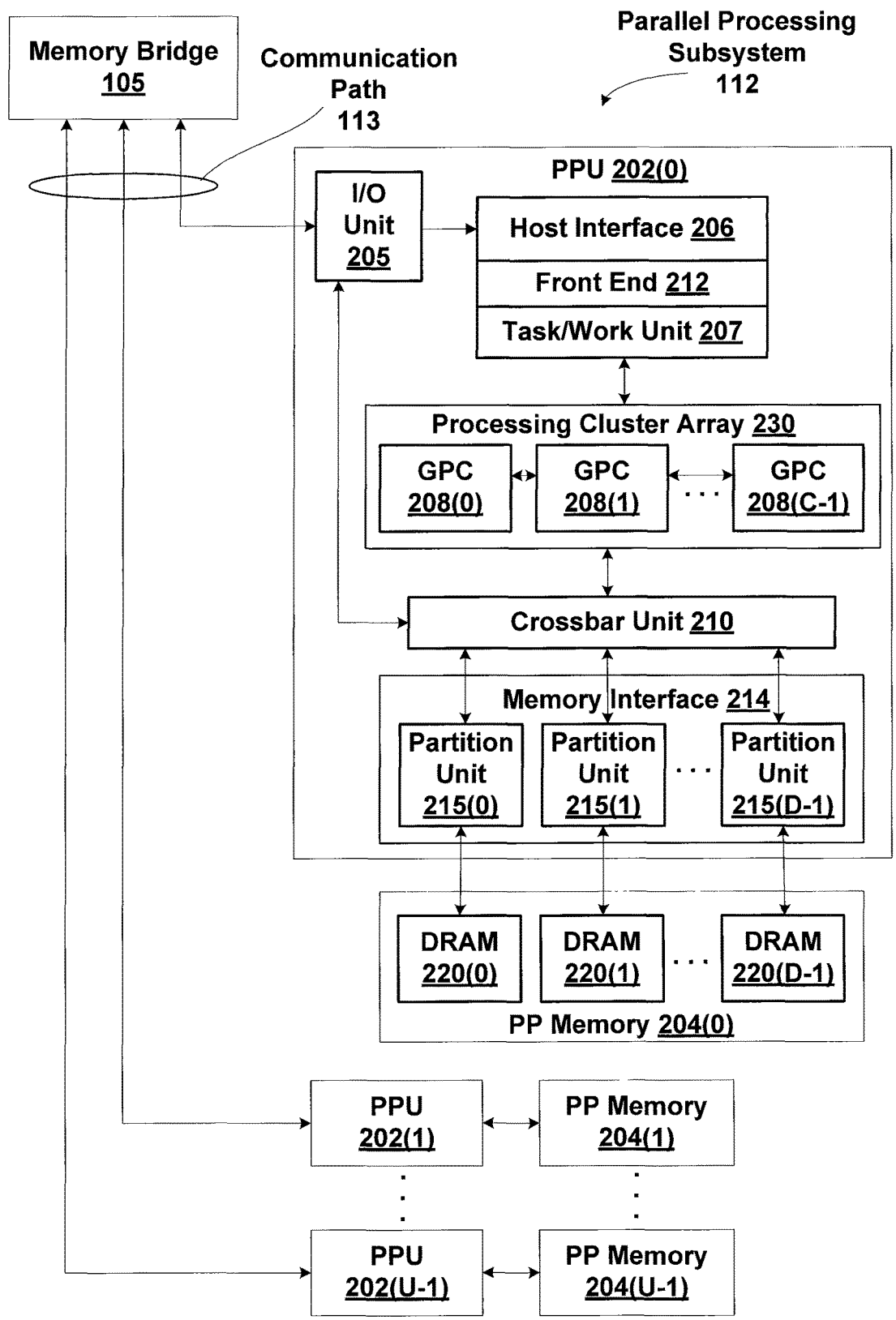
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
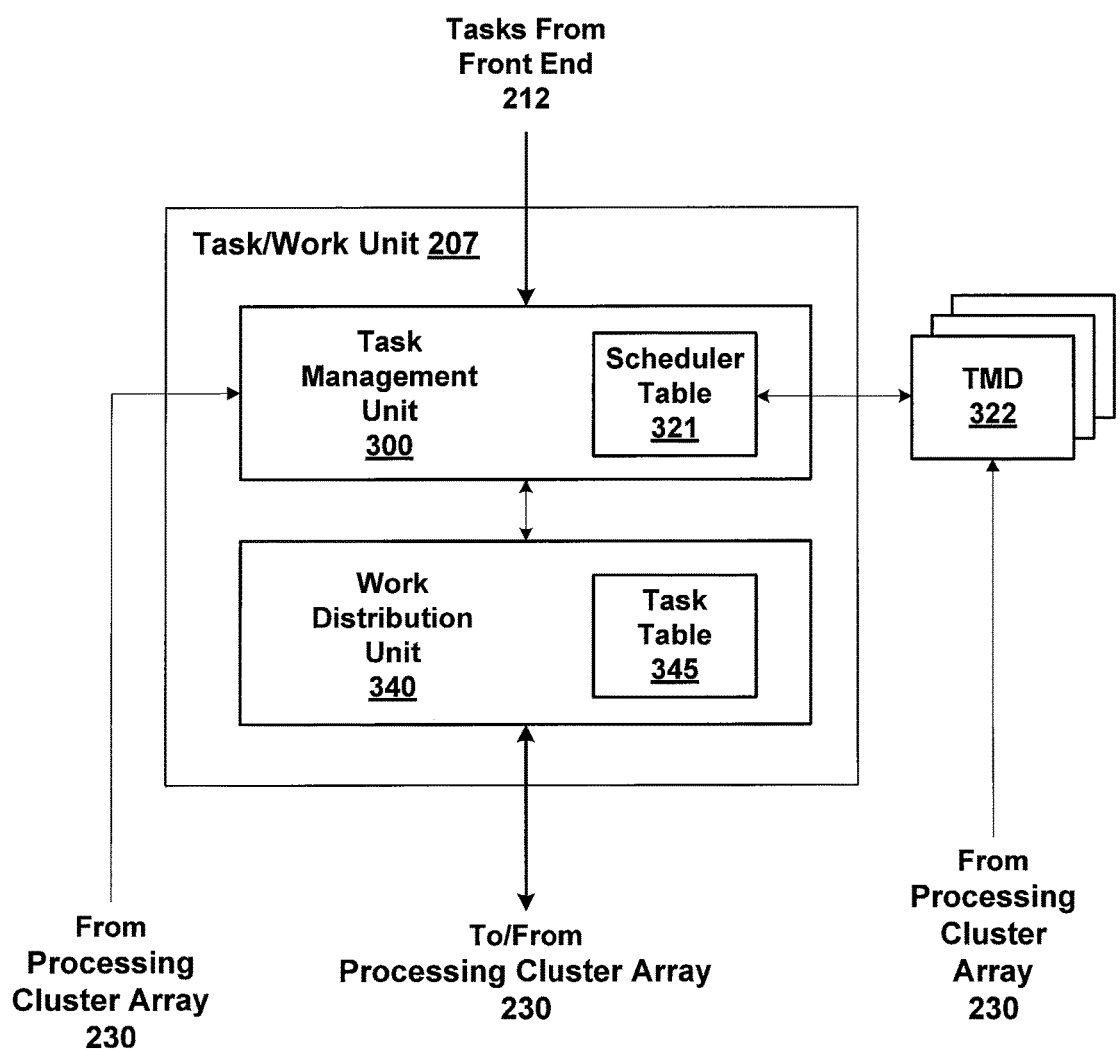
FIG. 3A is a block diagram of the front end of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
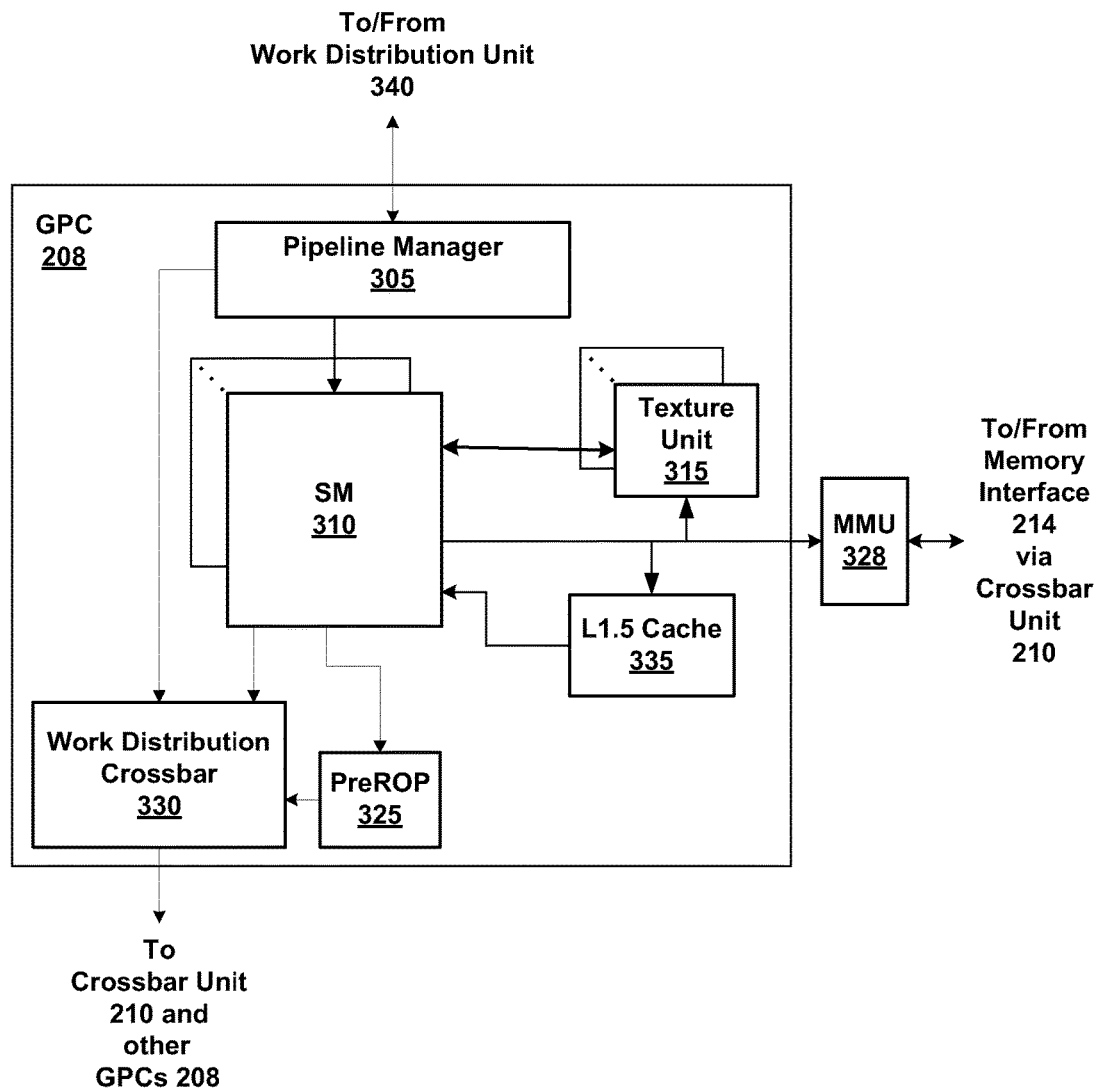
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
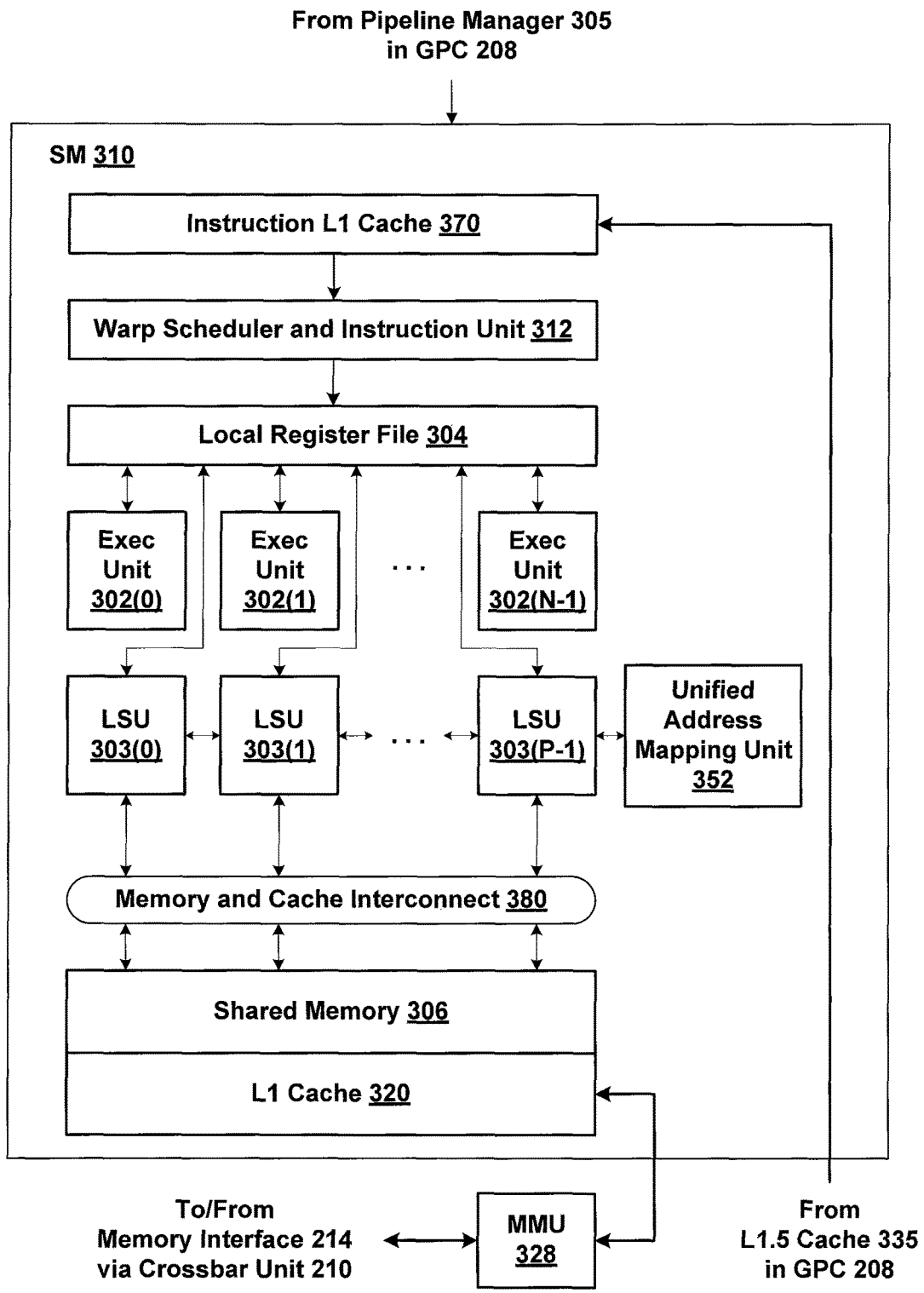
FIG. 3C is a block diagram of a portion of the streaming multiprocessor of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Nested Execution Streams

Nested parallelism enables threads within a thread group, described above, to independently launch one or more child thread groups and to perform thread synchronization boundaries on the one or more child thread groups to maintain proper execution order. This fundamental capability enables broad classes of algorithms that require conditional execution to be mapped efficiently onto parallel processing subsystem 112. Cross stream dependencies among tasks comprising thread groups are facilitated by transforming a hierarchical execution graph to include firing events and waiting events that may wait for a firing event or a task before completing. Supporting cross stream dependencies within parallel processing subsystem 112 enables a more complete semantic model for computation without incurring inefficiencies associated with CPU-based task management.

Figure 4:
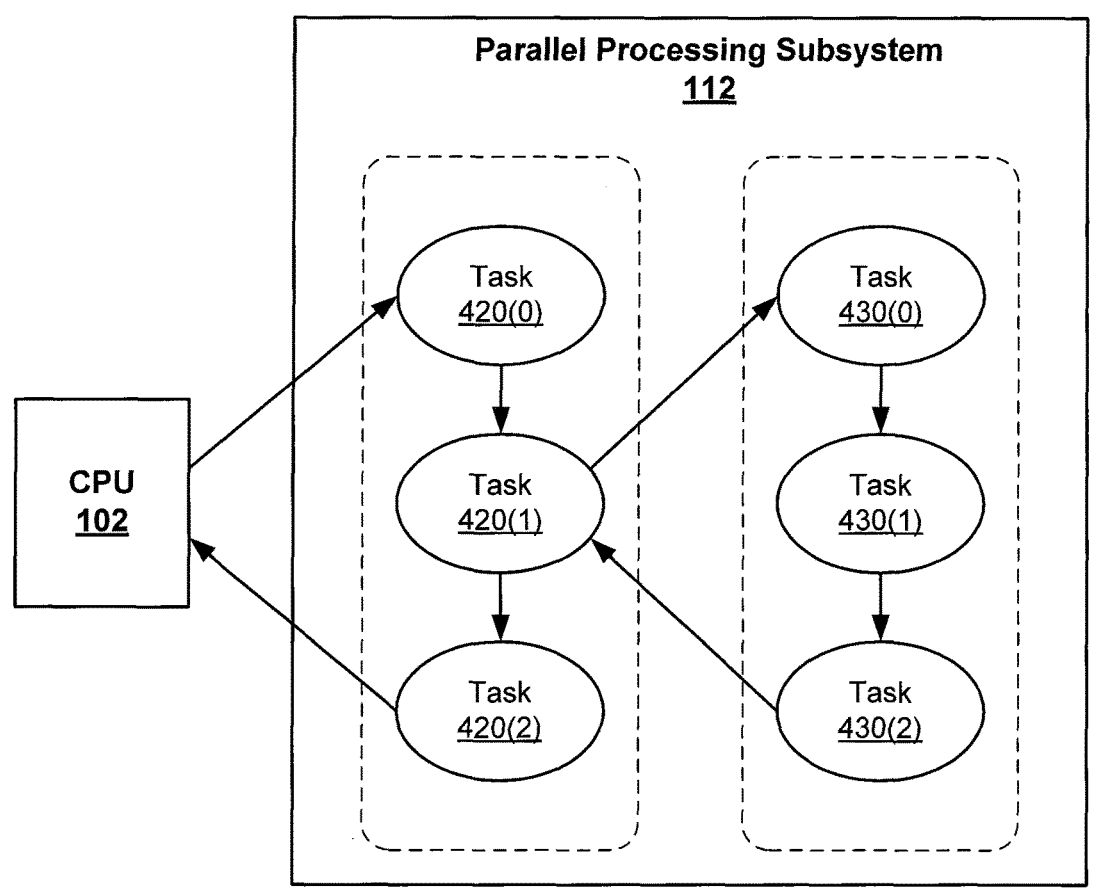
FIG. 4 illustrates nested task execution on a parallel processing subsystem, according to one embodiment of the present invention.

FIG. 4 illustrates nested task execution on parallel processing subsystem 112, according to one embodiment of the present invention. As shown, CPU 102 initiates execution of exemplary tasks 420 on parallel processing subsystem 112. After task 420(0) completes, task 420(1) executes. After task 420(1) completes, task 420(2) executes. During the course of execution, task 420(1) invokes tasks 430(0) through 430(2), for example, to compute an intermediate result used by task 420(1). To maintain proper instruction execution order, task 420(1) should wait until tasks 430 complete before continuing. To wait in this way, task 420(1) may block at a thread synchronization barrier on tasks 430. Each task 420, 430 may be performed by one or more threads, CTAs, or grids, as defined previously.

In this example, task 420(1) is a parent of tasks 430, which are therefore children of task 420(1). While only one level of parent-child hierarchy (nesting depth) is shown in FIG. 4, an arbitrary hierarchy may be implemented in practice. In one embodiment, nesting depth is limited by a number of scheduling groups. Priority may be assigned to child execution over parent execution within the scheduling groups. In one embodiment, tasks 420 and 430 each execute as at least one thread group, or at least one CTA within SM 310 of FIG. 3B. To enable thread programs having a parent and child relationship to execute on SM 310, three system elements should be implemented, including hardware functionality for parallel processing subsystem 112, software runtime functionality for parallel processing subsystem 112, and language support constructs for programming parallel processing subsystem 112.

The hardware functionality required to support a parent thread launching a child thread, CTA, or grid within parallel processing subsystem 112 includes launching a new grid or CTA of work from a request generated by SM 310 and queued for execution to task/work unit 207, saving execution state for SM 310, continuing execution within SM 310 from the saved execution state, and facilitating memory coherence between a parent and child task. The runtime features required to support a parent thread launching a child thread, CTA, or grid within processing subsystem 112 includes launching a new grid in response to a request from a thread executing within SM 310, enabling a parent thread to perform a thread synchronization barrier on a child thread group, ensuring memory coherence between the parent thread and the child group, scheduling work and continuation of synchronized thread groups for guaranteed forward computational progress, and ensuring proper execution semantics for parent threads and child groups. The language support constructs include a mechanism for specifying the launch of a child thread program from a parent thread, and executing a synchronization barrier on the child program.

Parallel processing subsystem 112 is programmed using a thread-oriented programming environment, such as the CUDA™ programming environment from NVIDIA™. In one embodiment, the CUDA language specification is expanded to include a child launch construct ("<<< >>>") to specify details for launching a child CUDA grid. The child launch construct, indicated herein as "A<<<B>>>C", includes a child program name (A), grid launch parameters (B), and input parameters (C). The CUDA runtime environment is expanded to enable a parent thread to perform a synchronization barrier on the child CUDA grid. Although the present discussion illustrates embodiments of the invention in the context of the CUDA programming environment, persons skilled in the art will recognize that the techniques taught herein are applicable to any parallel programming environment and any parallel processing system. As such, references to CUDA are for illustrative purposes only and are not intended to limit to scope or spirit of the present invention.

Table 1, below, illustrates use of the child launch construct and synchronization barrier in an exemplary CUDA program:

TABLE 1

```
__global__ void foo( )
{
    void *ptr = malloc(1024);
    A<<< 1, 1 >>>(ptr);   // child launch
    cudaThreadSynchronize( );   // sync barrier
    do_stuff(ptr);
}
```

In this example, an instance of thread program "foo( )" launches a child grid using a thread program "A" with a pointer (*ptr) to memory allocated by foo( ). The allocated memory is accessible to threads within the child grid. The parent thread foo( ) is able to continue after child grid A completes, indicated by a return from a blocking synchronization barrier function call, herein named cudaThreadSynchronize( ).

Figure 5:
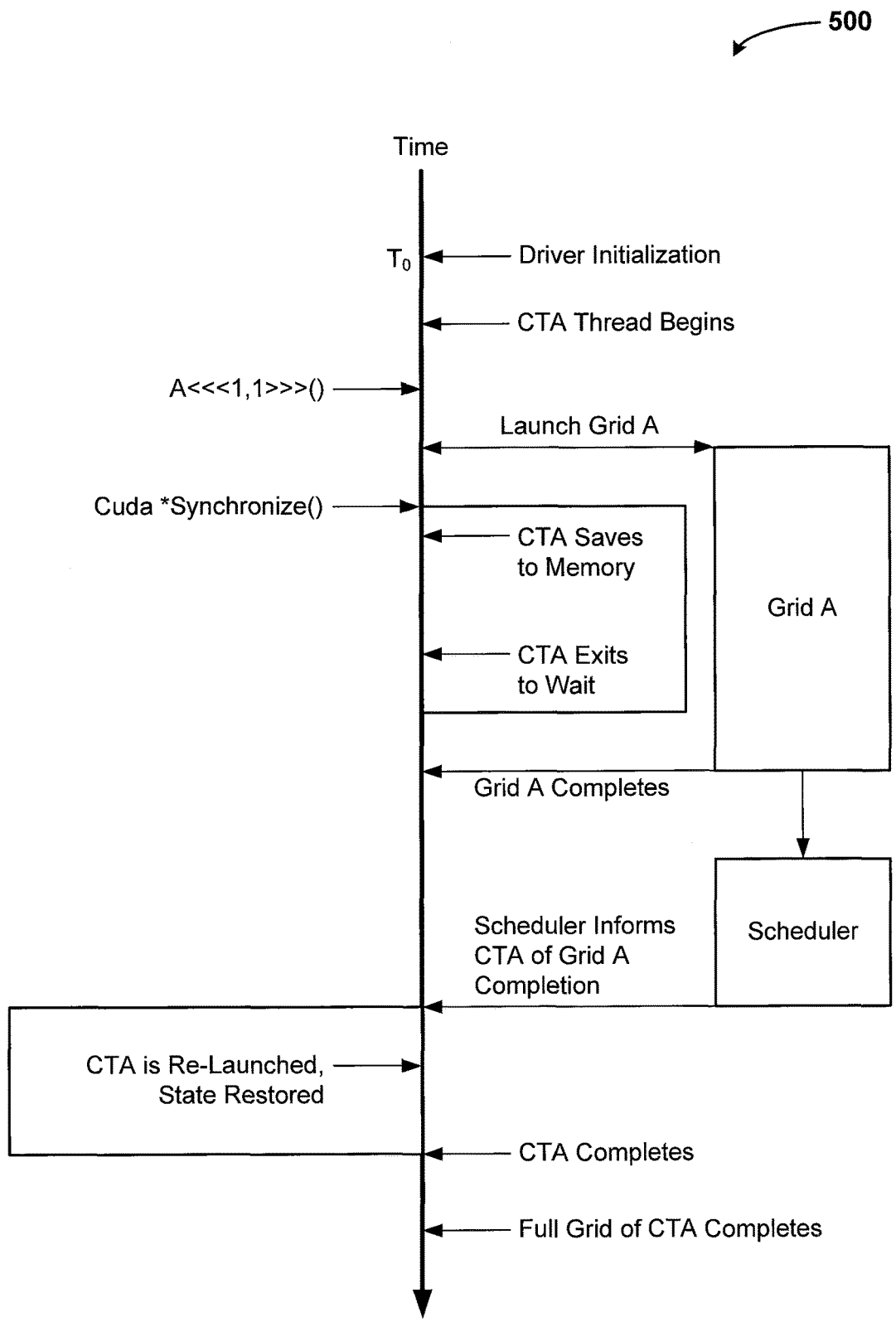
FIG. 5 illustrates a sequence of events for a parent thread program to launch a child grid, according to an embodiment of the present invention.

FIG. 5 illustrates a sequence of events 500 for a parent thread program to launch a child grid, according to an embodiment of the present invention. Referring back to Table 1, the parent thread may be an instance of thread program foo( ), while the child grid may comprise child grid A( ), launched according to the child launch construct.

The sequence of events 500 begins at time $T_0$, where a software driver for parallel processing subsystem 112, such as device driver 103, initializes a CTA within SM 310. For example, the software driver may initialize foo( ) from Table 1 as a CTA within SM 310. Subsequently, the CTA begins to execute as at least one thread. For example, a thread of "foo( )" with thread identifier x==0, y==0 begins to execute. The thread then executes a child launch using child launch construct "A<<<1,1>>>." The child launch process, described in greater detail below, causes child grid A to begin executing. At this point, the thread is a parent thread of child grid A. The parent thread then executes a call to cudaThreadSynchronize( ), which blocks execution of the parent thread until child grid A completes. Because the call to cudaThreadSynchronize( ) is for synchronizing to a child grid, the CTA associated with the parent thread may be halted while waiting for the child grid. To halt the CTA, execution state for the CTA is saved to a continuation state buffer. The continuation state buffer may reside in PP memory 204, system memory 104, or any other technically feasible memory storage subsystem coupled to parallel processing subsystem 112. The CTA then exits and waits for child grid A to complete. Upon exiting, SM 310 is freed and may be assigned other tasks for execution while child grid A executes. In one embodiment, resources associated with the CTA and allocated from SM 310 are de-allocated. Deadlock is avoided because the CTA foo( ) releases resources to allow forward computational progress.

Once child grid A completes, a scheduler, such as task/work unit 207 of FIG. 2, is notified. The CTA having the parent thread is then scheduled to be re-launched with execution state restored from the continuation state buffer. The CTA is informed that child grid A completed, allowing execution of the parent thread to progress through the synchronization barrier established earlier by a call to cudaThreadSynchronize( ). The CTA subsequently completes, and any associated grid of CTAs is then able to complete.

In one embodiment, the process of a parent thread launching a child grid comprises preparing memory elements within parallel processing subsystem 112 to present the child grid with a consistent view a memory space associated with the parent. Launching the child grid may be implemented using CUDA runtime calls, including a system memory barrier (membar.sys) to guarantee memory consistency between parent and child. Executing the system memory barrier has the effect of flushing all pending write data from the parent to memory, such as PP memory 204. Flushing all pending writes allows any thread within the child grid to safely read arbitrary data from the memory space of the parent while executing on an arbitrary SM 310. Those of ordinary skill in the art will understand that flushing caches is one means to ensuring memory consistency, but other approaches are possible.

Once the memory barrier has been executed, a CUDA runtime call, referred to herein as cudaRTLaunch( ), may be executed to launch the child grid. In one embodiment, the CUDA runtime call to cudaRTLaunch( ) queues a new task for execution to the scheduler by presenting a posted compare and swap (PCAS) message to a memory management unit, such as MMU 328 of FIG. 3B, which reflects the message back to the scheduler. A PCAS operation represents one mechanism for SM 310 to schedule work. The PCAS operation is implemented as a blocking (posted) synchronization operation that is performed by MMU 328. The PCAS operation atomically compares a present value of memory at a specified memory location to a first specified value and over writes the memory location with a second specified value if, and only if, the present value of memory matches the first specified value.

The thread synchronization barrier call cudaThreadSynchronize( ), shown in Table 1, initiates a series of events to save the current execution state of the calling (soon to be parent) thread. In this example, the calling thread is foo( ). The call to cudaThreadSynchronize( ) may explicitly reference a child grid being launched by the calling thread. In one embodiment, parallel processing subsystem 112 is configured to save all relevant execution state for a CTA executing within a GPC 208, including all relevant architectural state for each associated SM 310, to the continuation state buffer. In certain embodiments, one or more continuation state buffers reside in predetermined locations in memory.

Upon completion of the child grid a scheduling mechanism is invoked to decide what task(s) should be scheduled to run next. A thread program is also commonly referred to as a "kernel." In one embodiment a scheduler kernel is invoked as an "AtExit" task that executes when a grid, such as the child grid, completes. The scheduler kernel discovers what related work has been completed and what work remains outstanding. The scheduler kernel then decides what should be scheduled to run next. In the example of Table 1, the scheduler kernel re-launches CTA foo( ).

The process of re-launching a parent CTA after a child completes is referred to herein as a continuation process. In one embodiment this involves executing a restoration kernel, invoked as an "AtEntry" task, to restore execution state from a continuation state buffer for the grid. While a restoration kernel may be implemented to restore execution state, any technically feasible technique may be implemented to restore execution state without departing the scope and spirit of the present invention. To ensure memory consistency upon continued execution, caches for SM 310 executing the grid are invalidated, forcing out any irrelevant or stale state from a previous grid executing within the same SM 310. Those of ordinary skill in the art will understand that flushing caches is one means to ensuring memory consistency, but other approaches are possible. After restoring execution state, and after ensuring memory consistency, the restoration kernel resumes execution of the parent CTA by jumping to the instruction following the cudaThreadSynchronize( ) call.

As with any CUDA thread program, each thread executes independently. Therefore, if a given thread program is coded to perform an unconditional launch, then every executing instance of the thread program will perform that launch command. In an exemplary CUDA program, shown in Table 2, each instance of foo( ) performs an unconditional launch of kernel "bar( )", yielding a net of one hundred executing bar( ) kernels.

TABLE 2

```
__global__ void foo( )
{   void *ptr = malloc(1024);
    bar<<< 1, 1 >>>(ptr);
    cudaThreadSynchronize( );
    do_stuff(ptr);
}
void main( )
{
    // Launch 100 threads of "foo"
    foo<<< 1, 100 >>>( );
    cudaThreadSynchronize( );
}
```

A modified version of the CUDA program in Table 2 is given in Table 3. In this modified CUDA program, only one thread (with x==0) from foo( ) executes, so only this one thread from foo( ), executing independently, actually launches a child grid. In this example, only one total child grid comprising thread program bar( ) is launched from all one hundred executing instances of foo( ).

TABLE 3

```
__global__ void foo( )
{
    void *ptr = malloc(1024);
    if(threadIdx.x == 0)
        bar<<< 1, 1 >>>(ptr);
    cudaThreadSynchronize( );
    do_stuff(ptr);
}
void main( )
{
    // Launch 100 threads of "foo"
    foo <<< 1, 100 >>>( );
    cudaThreadSynchronize( );
}
```

Although each CUDA thread executes independently, CUDA primitives may be used by all threads within a thread block. For example, one thread may create a CUDA stream and any other thread within the thread block may use the stream. Each thread block, however, still remains independent. An exemplary CUDA thread program is shown in Table 4, where a parent thread program foo( ) creates a stream that is shared among threads within a child CTA of thread program bar( ).

TABLE 4

```
__shared__ cudaStream_t stream;
__global__ void foo( )
{
    if(threadIdx.x == 0)
        cudaStreamCreate(&stream);
    __syncthreads( );
    bar<<< 1, 1, 0, stream >>>( );
    cudaThreadSynchronize( );
}
void main( )
{
    foo <<< 1, 100 >>>( );
    cudaThreadSynchronize( );
}
```

In one embodiment, a hierarchy of executing kernels having a parent and arbitrary child kernels is structured to be composable, meaning only the parent kernel is visible from outside the hierarchy. In other words, when a parent kernel launches child kernels, the child kernels appear as part of the parent kernel. This means the parent kernel and all child kernels must complete execution for the parent to be considered as having completed execution. By way of example, all work associated with task 20(0) of FIG. 4 must complete before task 420(1) is launched. Similarly, all work associated with task 420(1) and child tasks 430(0) through 430(2) must complete before task 420(1) is considered to have completed. Once task 420(1) has completed, task 420(2) may be launched.

Embodiments of the present invention advantageously enable a parent thread to independently launch one or more grids of child threads from within parallel processing subsystem 112. The ability to launch child threads enables new capabilities and approaches to the design of thread programs. For example, a thread program may call an externally defined library function by launching a corresponding kernel implementing the library function as a child. In another example, control over a substantial portion of data flow within an application may be performed by thread programs within parallel processing subsystem 112 without intervention by a related application executing on CPU 102. For example, implementing an overall control loop for an application within one or more threads executing on parallel processing subsystem 112 may enable the application to efficiently execute data-dependent algorithms, recursive algorithms, and algorithms with complex execution dependencies, such as multiply nested conditional loops.

An exemplary function, main( ), having nested conditional loops is illustrated in Table 5. As shown, this function has an unconditional outer loop with loop index "i", a nested conditional loop with index "j", and conditional execution of function do_stuff( ). Static unrolling of main( ) is not practical, nor is attempting to compute which conditional loop ranges should execute. As a consequence, conventional parallel processing systems are unable to efficiently process this and other types of conditional execution structures that are inherent to many important classes of algorithms known in the art.

TABLE 5

```
void main( ) {
    for(i...imax) {
        if(condition1) for(j...jmax) {
            if(condition2) for(k...kmax) {
                if(condition3) do_stuff(data, i, j, k);
            }
        }
    }
}
```

Embodiments of the present invention provide the child launch construct, which enables an independently executing thread program to compute when to call do_stuff( ). In Table 6, an instance of cuda_inner_loop( ) is conditionally launched as a child grid having kmax instances in only those iterations where "condition2" is met. The function do_stuff( ) is conditionally performed within cuda_inner_loop( ) when "condition3" is met. Note that each launched cuda_inner_loop( ) child advantageously executes asynchronously and concurrently with other instances of cuda_inner_loop( ). Implementing this loop structure would have been complex and inefficient using the conventional GPU execution model, because the CPU would have been required to conditionally launch each child grid of cuda_inner_loop( ), only when condition2 is met.

TABLE 6

```
__global__ void cuda_inner_loop(data, i, j) {
    if(condition3) do_stuff(data, i, j, threadIdx.x);
}
void main( ) {
    for(i...imax) {
        if(condition1) for(j...jmax) {
            if(condition2) {
                cuda_inner_loop<<< kmax >>>(data, i, j);
            }
        }
    }
}
```

Another implementation of the nested loop illustrated in Tables 5 and 6 is shown in Table 7. Here, the outer loop conditional may also be evaluated in parallel by separate threads, and each level of loop can now be launched conditionally as children if the appropriate condition or conditions are satisfied.

TABLE 7

```
__global__ void cuda_inner_loop (data, i, j) {
    if(condition) do_stuff(data, i, j, threadIdx.x);
}
__global__ void cnp_loop_j(data, i) {
    if(condition) cuda_inner_loop<<< kmax >>>(data, i, threadIdx.x);
}
__global__ void cnp_loop_i(data, i) {
    if(condition) cnp_loop_j<<< jmax >>>(data, threadIdx.x);
}
void main( ) {
    cnp_loop_i<<< imax >>>(data);
}
```

Figure 6:
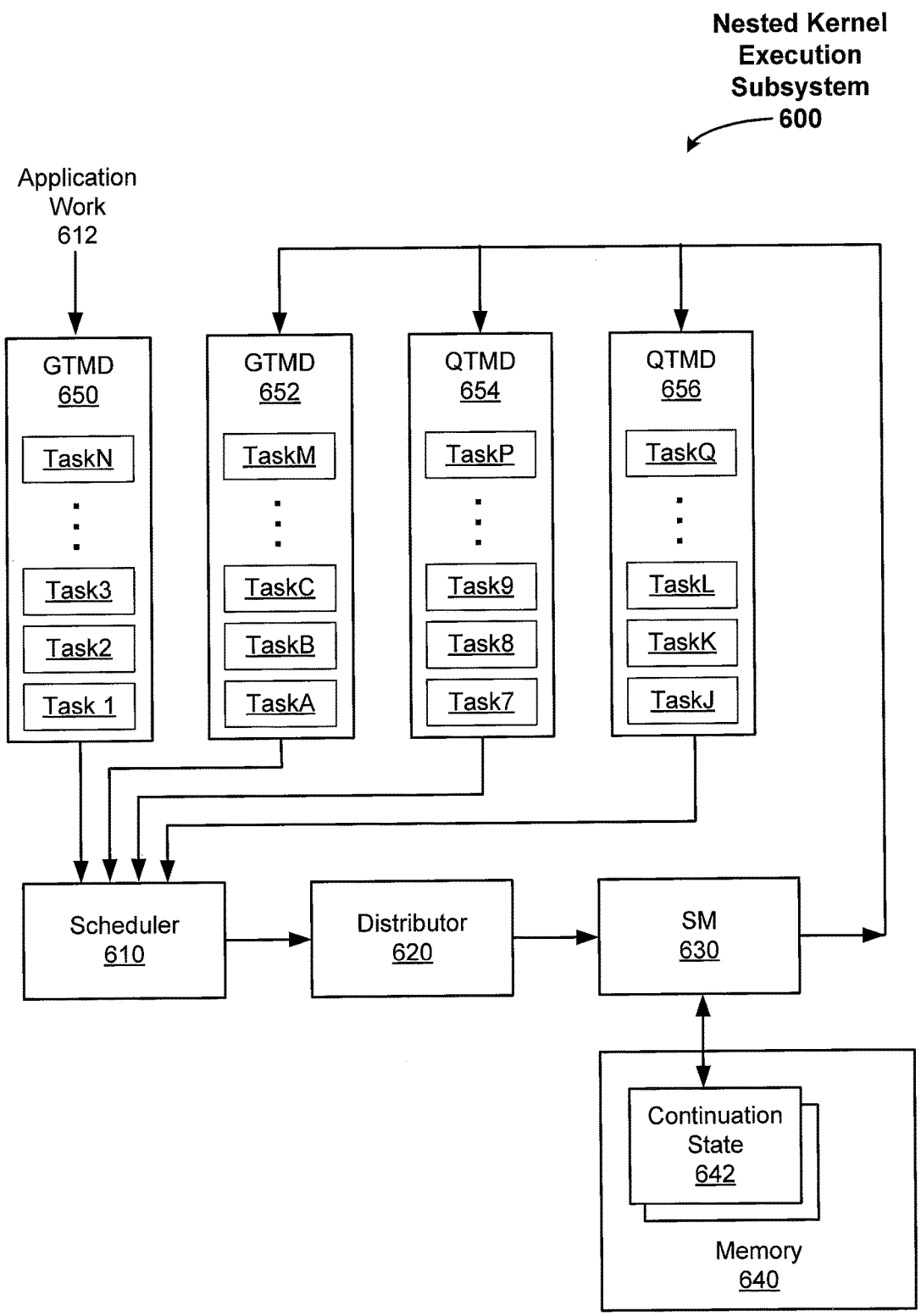
FIG. 6 illustrates system elements for a nested execution subsystem, according to one embodiment of the present invention.

FIG. 6 illustrates system elements for a nested execution subsystem 600, according to one embodiment of the present invention. Nested kernel execution subsystem 600 comprises hardware and software structures implemented within parallel processing subsystem 112 of FIG. 1, including a grid task metadata descriptor (GTMD) queue 650 for receiving and storing application work 612, for example from CPU 102 of FIG. 1. The application work 612 comprises an ordered sequence of GTMDs, labeled task1 through taskN. Scheduler 610 is configured to receive each GTMD and schedule a corresponding grid for execution on the SM 630 via the distributor, which serves to allocated threads as CTAs within the SM 630. The continuation state buffer discussed in FIG. 5 may be stored in continuation state buffer 642, residing within memory 640. In one, embodiment, scheduler 610 comprises task management unit 300 of FIG. 3A, distributor 620 comprises work distribution unit 340, SM 630 comprises SM 310 of FIG. 3B, and memory 640 comprises PP memory 204, system memory 104, or a combination thereof.

When a thread executing within SM 630 launches a child CTA, a new GTMD is generated for the child CTA and queued for execution within GTMD queue 652. Scheduler 610 is able to distinguish new application work 612 arriving from GTMD queue 650 from nested processing work arriving in GTMD queue 652 because each set of work is stored in separate queues. Scheduler 610 may assign different execution priority at different times to work stored in each GTMD queue using any technically feasible technique that guarantees forward execution progress.

When a grid executing within SM 630 is halted in response to calling cudaThreadSynchronize( ), execution state is stored to continuation state buffer 642, and a scheduler kernel is queued for execution. In one embodiment, the scheduler kernel is queued for execution in a queue of task metadata descriptors QTMD 654. For example, task7 may comprise a descriptor for a scheduler kernel queued for execution within QTMD 654 by a CTA that previously exited SM 630, and taskP may comprise a most recent scheduler kernel queued for execution by a most recently exited CTA from SM 630.

In one embodiment, a restoration kernel is executed to prepare resources within SM 630 for resumed execution of a CTA that previously exited by executing cudaThreadSynchronize( ). In certain implementations, the restoration kernel is queued for execution within QTMD 654. In alternative implementations, the restoration kernel, such as taskQ, is queued for execution within a separate QTMD 656 for greater scheduling flexibility. While execution restoration of the CTA is described above in terms of a restoration kernel, any other technically feasible technique may also be implemented to restore execution of the CTA without departing the scope and spirit of the present invention.

Nested kernel execution subsystem 600 provides a system for suspending and continuing execution of arbitrary thread groups within a parallel processing subsystem, while addressing memory consistency and proper execution semantics for each thread and each parent-child relationship within a hierarchical execution graph.

Figure 7:
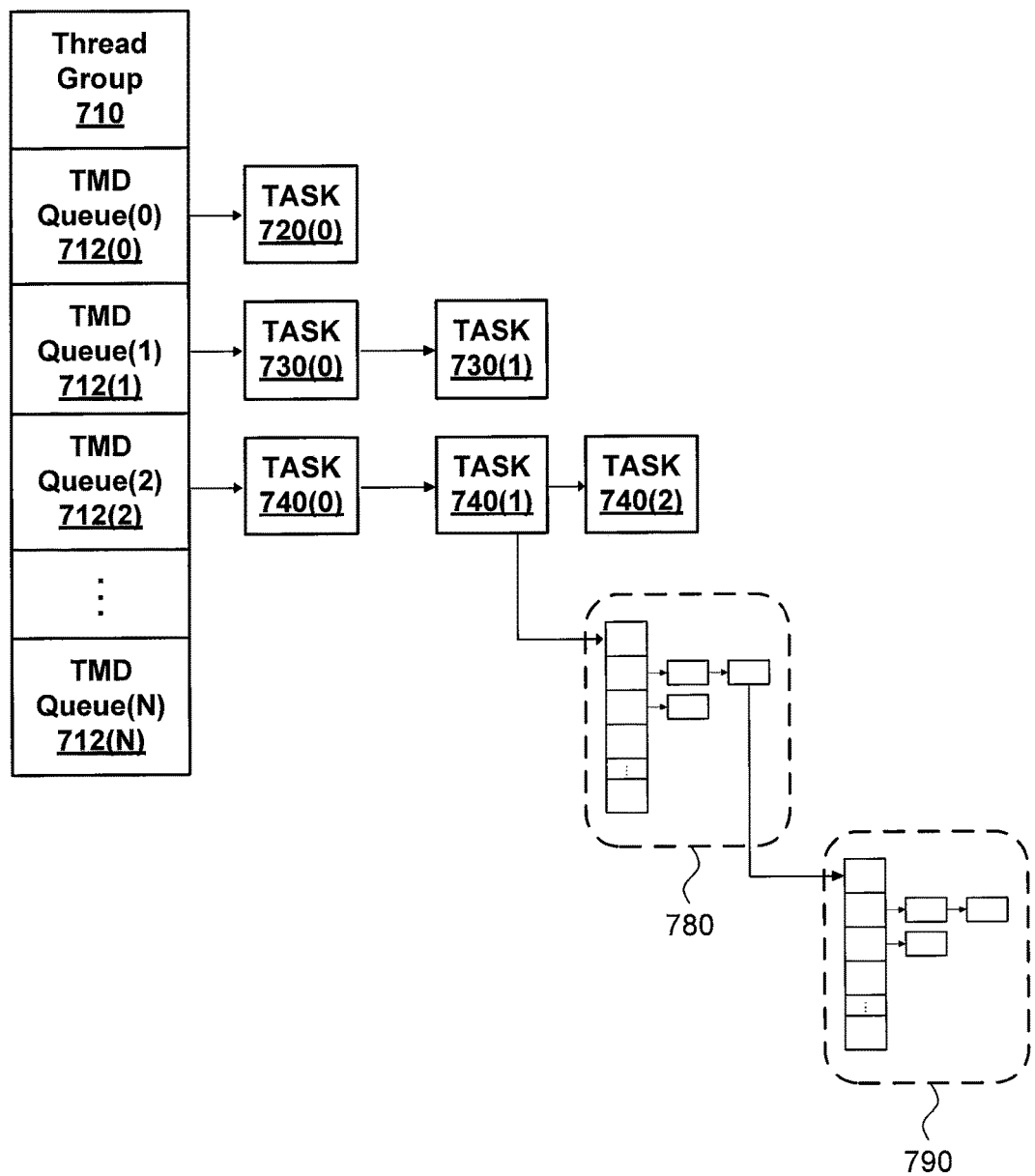
FIG. 7 illustrates an exemplary hierarchical execution graph including associated task metadata descriptor queues and tasks, according to one embodiment of the present invention.

FIG. 7 illustrates an exemplary hierarchical execution graph including associated task metadata queues and tasks, according to one embodiment of the present invention. As shown, the hierarchical execution graph includes thread group 710 at nesting depth 0, task metadata descriptor queues (TMDQs) 712, tasks 720, 730, 740, an execution graph 780 at nesting depth 1, and an execution graph 790 at nesting depth 2.

The thread group 710 at nesting depth 0 includes threads created and managed by CPU 102. A thread group includes any set of threads, including a CTA, where all threads exist at the same nesting depth. The nesting depth of a thread is the number of parent grids above the level of the thread. For example, a CPU thread has a nesting depth of 0, because there are no parent grids above a CPU thread. If that CPU thread launches a grid, then that grid is said to be at nesting depth 1. If a thread in the grid at nesting depth 1 launches a new grid, then the new grid is said to be at nesting depth 2, and so forth. Because the threads in thread group 710 are CPU threads, each of these threads are at nesting depth 0.

TMDQs 712 include pointers to data structures for pending tasks, as further described below. Each TMDQ 712 points to tasks belonging to one or more streams. TMDQ (0) 712(0) points to task 720(0) associated with a first stream. TMDQ (1) 712(1) points to tasks 730(0) and 730(1) associated with a second stream. TMDQ (2) 712(2) points to tasks 734(0), 740(1), and 740(2) associated with a third stream. Any number of TMDQs 712 may be defined where each TMDQ 712 includes an arbitrary number of tasks.

Tasks 720, 730, 740 comprise data structures that include one or more commands to be executed by the GPU. Tasks launched onto a given TMDQ 712 execute in sequential order. Task 730(0) completes before task 730(1) begins execution. Likewise, Task 740(0) completes before task 740(1) begins execution, which, in turn, completes before task 740(1) begins execution. A task at the front of a TMDQ 712 begins execution as soon as the task is launched. So, tasks 720(0), 730(0), and 740(0) execute as soon as those tasks are launched. Tasks in different TMDQs 712 have no sequential dependencies. For example, task 730(1) could execute either before, after, or concurrently with task 740(1).

Execution graph 780 at nesting depth 1 is a thread group, plus the associated TMDQs and tasks, which has been launched by one of the tasks at nesting depth 0. Any task may launch one or more grids, where such grids are at a nesting depth that is one greater than the nesting depth associated with the task that launched the grid. As shown, task 740(1), existing at nesting depth 0, launched execution graph 780 sometime during the execution of task 740(1). Each task and TMDQ within execution graph 780 functions essentially the same as tasks and TMDQs at nesting depth 0. When each task within execution graph 780 completes, and all other commands in task 740(1) have completed, then task 740(2) may begin execution.

Execution graph 790 at nesting depth 2 is a thread group plus associated TMDQs and tasks, that has been launched by one of the tasks at nesting depth 1. Each task and TMDQ within execution graph 790 functions essentially the same as tasks and TMDQs at lower nesting levels. When each task within execution graph 790 completes, then the launching task may complete once all other commands in the launching task have completed. In this manner, sequential execution is preserved within any grid, and grids may be nested to an arbitrary nesting depth while preserving sequential execution of tasks within a stream.

Threads within a thread group are defined in terms of a context, where the context is the set of threads that have access to the same stream and TMDQ resources. Threads within the same context may create and share TMDQs, so long as the threads are at the same nesting depth and on the same device (GPU, or CPU 102). For CPU threads, the context is defined as the set of threads associated with the CUDA context. For GPU threads, the context may represent a Cooperative Thread Array (CTA) or any set of threads that exist at the same nesting depth.

When a new stream is created by a CPU thread, CPU 102 dynamically allocates memory to support management of the stream. When the stream is subsequently destroyed after the completion of the streams tasks, CPU 102 frees the memory previously allocated for the stream. The GPU typically is not able to dynamically allocated memory. Therefore, the GPU pre-allocates context data for each context that may simultaneously execute. As a result, a thread group associated with a GPU grid has a fixed number of TMDQs that may not change during the execution of the grid. A new stream within a GPU grid is created with the cudaStreamCreate( ) function call. The function call returns an integer index pointing to one of the pre-allocated TMDQs in the grid. No dynamic allocation of memory is needed to create the stream. Once all tasks within a GPU stream have completed, the stream is destroyed with a cudaStreamDestroy( ) function call. Because no memory was dynamically allocated for the GPU stream, cudaStreamDestroy( ) has no memory to place back into a memory allocation free pool and therefore simply returns back to the calling program.

Once a stream has been created, new tasks may be launched into the stream by any thread in the associated context. When a thread launches a task into a stream, there may be no tasks in the associated TMDQ, or all previous tasks in the TMDQ may have completed execution. In such a case, the task may begin execution immediately after the task is launched into the TMDQ. Alternatively, the TMDQ may have one or more pending tasks that have not completed execution. In such a case, the new task is launched into the TMDQ, but the task does not begin execution until the pending prior tasks complete execution. In either case, the new task is launched into the TMDQ via non-locking operations requiring no intervention from CPU 102.

Figure 8:
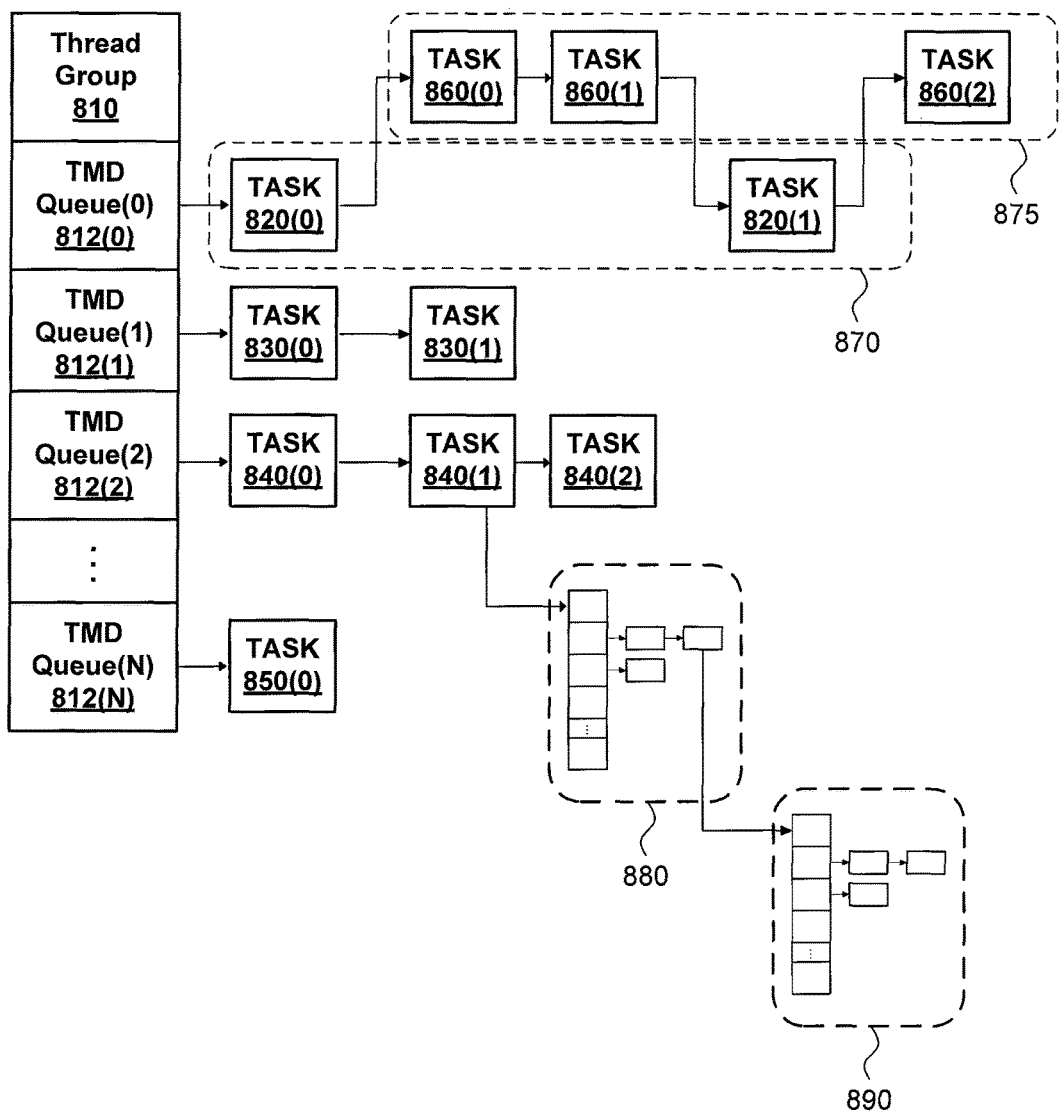
FIG. 8 illustrates a related hierarchical execution graph including associated task metadata descriptor queues and tasks, according to another embodiment of the present invention.

FIG. 8 illustrates a related hierarchical execution graph including associated TMDQs and tasks, according to another embodiment of the present invention. As shown, the hierarchical execution graph includes thread group 810 at nesting depth 1, TMDQs 812, tasks 820, 830, 840, 850, 860, an execution graph 880 at nesting depth 2, and an execution graph 890 at nesting depth 3. The components of the hierarchical execution graph function substantially as described above in conjunction with FIG. 7 except as detailed below.

As shown, each TMDQ 812 of thread group 810 has one or more pending tasks. In one example, task 820(0) associated with stream 870 could have been launched into TMDQ 812(0), but task 860(0) associated with stream 875 would not yet have been launched. Tasks 830 associated with one stream could have been launched into TMDQ (1) 812(1). Likewise, tasks 840 associated with a second stream could have been launched into TMDQ (2) 812(2), tasks 850 associated with a third stream could have been launched into TMDQ (N) 812(N), and all intervening TMDQ 812 could also have one or more associated tasks. At such a time, a thread within thread group 810 could attempt to create a new stream 875. However, the thread group 810 has a nesting depth of 1, and is associated with the GPU. Because the GPU is not able to dynamically allocate memory, a new TMDQ could not be created to accommodate the new stream 875. In such a case, tasks 860 associated with the new stream 875 could be launched into TMDQ (0) currently being used by stream 870. Stream 875 could launch tasks 860(0) and 860(1) into TMDQ (0) 812(0). Stream 870 could then launch task 820(1) into TMDQ (0) 812(0). Stream 875 could then launch task 860(2) into TMDQ (0) 812(0). Note that this approach results in unneeded dependencies. Even though streams 870 and 875 are independent of each other, the sequential nature of TMDQs results in task 860(0) depending on completion of task 820(0), task 820(1) depending on completion of task 860(1), and so on. While performance could decrease as a result, sequential ordering of tasks 820 in stream 870 and tasks 860 in stream 875 is properly preserved.

Figure 9A:
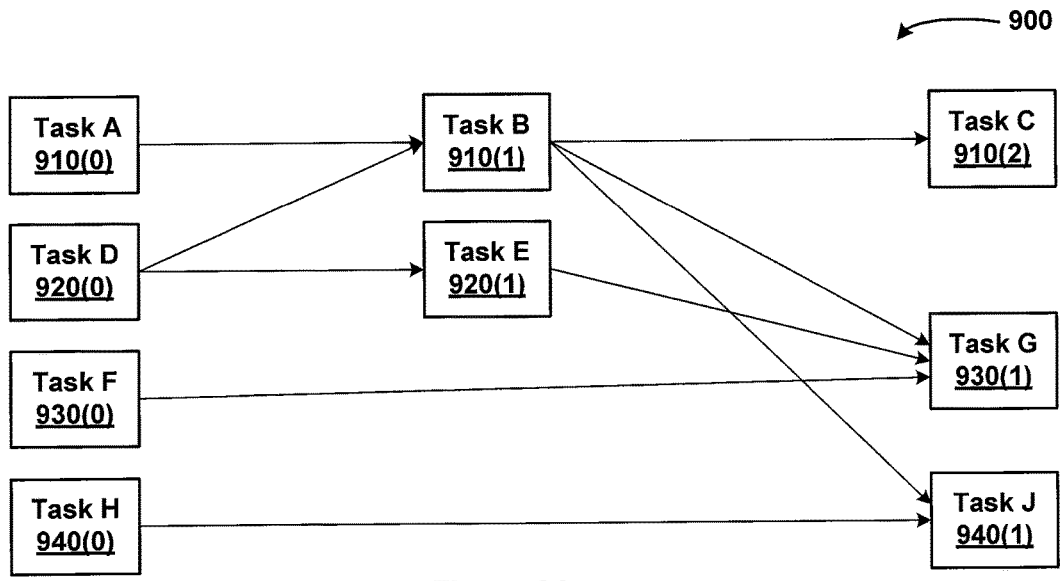
FIG. 9A illustrates an exemplary hierarchical execution graph of tasks having cross stream dependencies, according to one embodiment of the present invention.

FIG. 9A illustrates an exemplary hierarchical execution graph 900 of tasks having cross stream dependencies, according to one embodiment of the present invention. Tasks 910 are queued within a first stream, tasks 920 are queued within a second stream, tasks 930 are queued within a third stream, and tasks 940 are queued within a fourth stream. As shown, task B 910(1) depends on both task A 910(0) and task D 920(0) completing before executing. The dependency of task B 910(1) on task D 920(0) represents a cross stream dependency. As shown, task G 930(1) also has a cross stream dependency on task E 920(1) and task B 910(1). Similarly, task J 940(1) has a cross stream dependency on task B 910(1).

In one embodiment, task dependencies, including cross stream dependencies, are specifies using CUDA function calls cudaEventCreate( ), cudaEventRecord( ), and cudaStreamWaitEvent( ). The function cudaEventCreate( ) creates an event object and assigns an identifier to the event object. The event object may be referenced by cudaStreamWaitEvent( ) as an event upon which to wait. An event may be recorded to a respective stream by cudaEventRecord( ). These three function calls are implemented in prior art CUDA execution models that are managed by a GPU driver running within CPU 102. In such prior art execution models, CPU 102 explicitly schedules task execution to avoid deadlock conditions that may occur as a consequence of cross stream dependencies. Executing tasks having cross stream dependencies without CPU 102 management involvement enables greater overall execution efficiency, but also requires the cudaEventCreate( ), cudaEventRecord( ), and cudaStreamWaitEvent( ) calls to have analogous implementations that can execute within parallel processing subsystem 112. In one embodiment, the hierarchical execution graph is transformed into an equivalent hierarchical execution graph to facilitate implementation of the three calls, as described in greater detail below.

Figure 9B:
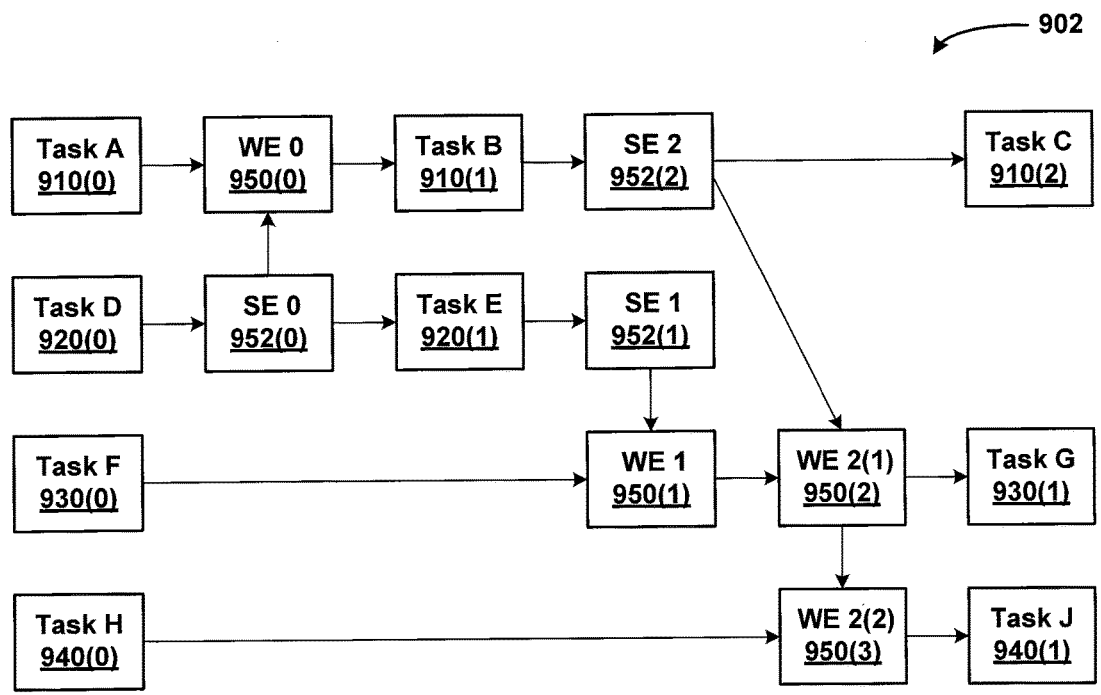
FIG. 9B illustrates an equivalent hierarchical execution graph of tasks and events for enforcing execution order among dependent tasks in different streams, according to one embodiment of the present invention.

FIG. 9B illustrates an equivalent hierarchical execution graph 902 of tasks and events for enforcing execution order among dependent tasks in different streams, according to one embodiment of the present invention. Cross stream dependence is managed using two new constructs, a wait event (WE) and a signaling (firing) event (SE). Each WE blocks until all input conditions are met. Each firing event generates one or more events upon being triggered. As shown, cross stream dependence of task B 910(1) on task A 910(0) and task D 920(0) is represented using WE 0 950(0) and SE 0 952(0). Similarly, cross stream dependence of task G 930(1) on task B 910(1), task E 920(1), and task F 930(0) is represented using WE 2(1) 950(2) and WE 1 950(1). Persons skilled in the art will recognize that hierarchical execution graph 900 of FIG. 9A and equivalent hierarchical execution graph 902 implement identical task dependencies and will therefore enforce identical execution order. Equivalent hierarchical execution graph 902 does not require locks and may therefore be implemented efficiently within parallel processing subsystem 112 without intervention from CPU 102.

A WE may be queued into a particular stream to enforce execution order. For example, WE 0 950(0) waits for task A 910(0) to complete and for SE 0 952(0) to fire to complete. Because SE 0 952(0) depends on task D 920(0) to complete, the cross stream dependence of task B 910(0) on both task A 910(0) and task D 920(0) is properly enforced.

On CPU 102, memory may be allocated and freed with minimal cost. However, on a GPU, memory may only allocated or freed when the GPU is idle. This restriction has implications for implementing cudaEventCreate( ) for GPU execution. To overcome memory allocation restrictions, a pre-allocated pool of event structures, which may be used for signaling and waiting functions, and returned to the free pool. When the GPU attempts to allocate an event, a sub-allocator attempts to acquire one of the pre-allocated event structures. If the allocation succeeds, then a reference to the structure is returned to the calling thread. However, if the attempted allocation fails, then an out-of-memory case must be handled. In an out-of-memory scenario, all new work is serialized into a single stream. This approach is safe for nested streams including events because the serialized stream satisfies proper event ordering semantics and is semantically equivalent to multiple streams with cross stream dependencies. Serializing all tasks into one stream will produce correct results at a potentially lower performance. To destroy an event object, the event object is simply returned to the free pool.

A thread may call cudaEventRecord( ) to queue an SE into a stream. If the event has already been recorded, a new event must be allocated and tracked as a most recent event record. A data structure, such as a task status data structure, described below in FIG. 11, describes signaling event state. The data structure may be queued into a given stream. Each signaling event maintains a list of events that are waiting on the signaling event to fire. Initially the list is empty, as no waiting event has year been created to wait on the signaling event. When the signaling event fires (there is not stream work ahead of it), an associated list is traversed to mark the signaling event as having fired. Furthermore, waiting events are notified that the signaling event has fired. Notifying a waiting event satisfies one or potentially, more events needed by the signaling event to complete, allowing a corresponding stream to progress.

A thread may create a cross stream dependency by calling cudaStreamWaitEvent( ) to queue a WE into a given stream. The waiting event must be first allocated from the free pool of event structures. In one embodiment, the WE looks up the most recent call to cudaEventRecord( ) on the referenced signaling event. If there is nothing to wait for, then the WE may complete. Once the most recent signaling event is found, the WE is atomically added to a waiting list associated with a respective signaling event object. A WE added to the same stream as the stream the SE to be waited upon is treated semantically as a null operation.

When a scheduler kernel is run upon completion of a grid, the scheduler should run the next task in an associated stream. If the next task another grid, then the scheduler kernel simply launches the grid. However, if the next task is an event (WE or SE), then the scheduler kernel needs to handle all ready to fire events (e.g., fire a signaling event, which unblocks one or more waiting events, which in turn may unblock one or more signaling events).

Each WE includes a data structure with a dependency count of how many items the WE is waiting on to complete. In one embodiment, the count may be zero, one or two. A count of zero indicates that the event has fired. A count of one indicates the WE is waiting on one task or event. A count of two indicates that the event is waiting on both a signaling event and another task or event in the same stream. This count is decremented atomically whenever a scheduler kernel determines that one dependency is satisfied. When the count is decremented to zero, a stream next (StreamNext) pointer within the data structure may be traversed and related dependency counts are decremented. All access to the dependency count should be atomic to guarantee that only one scheduler kernel attempts to schedule a next task in a stream, or schedule the dependent list of WE's.

When a signaling event fires, an entire related eventWaitingList must be traversed, decrementing every waiting event dependency count associated with the event. For events that have no more dependencies, each stream next pointer must be traversed. A stream next pointer associated with the signaling event must also be traversed because the signaling event is completing. To avoid the need to build a traversal state stack, the tree-walk algorithm is flattened. Any technically feasible non-recursive tree-walking technique may be implemented. On machines where limited thread-local stack space is less of an issue than current PPU implementations, any, technically feasible recursive tree-walking technique may be implemented.

Figure 10:
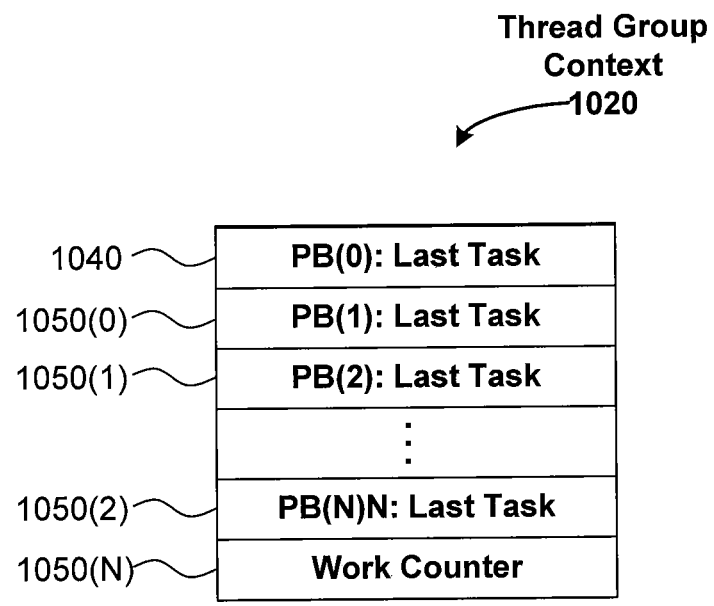
FIG. 10 illustrates a thread group context data structure including parameters and context information associated with a thread group, according to one embodiment of the present invention.

FIG. 10 illustrates a thread group context 1020 data structure including parameters and context information associated with a thread group, according to one embodiment of the present invention. As shown, the thread group context 1020 includes a last task pointer 1040 for each TMDQ in the thread group, and a work counter 1050.

The last task pointer 1040 is a pointer to the last task in the associated TMDQ. When a new task in launched into a TMDQ, the last task pointer 1040 is updated via an atomic operation to indicate the new task is now the last task in the TMDQ. Table 8, below, illustrates launching a new task in a TMDQ in an exemplary CUDA program.

TABLE 8

```
formerStreamEnd = atomicExchange(&streamEnd, newTask);
if (formerStreamEnd) {
    formerStreamEnd->streamNext = newTask;
} else {
    LaunchTask(newTask);
}
```

In the example of Table 8, the last task pointer 1040 at address StreamEnd is overwritten with a pointer to NewTask, and the prior value in the last task pointer 1040 is returned as FormerStreamEnd. If FormerStreamEnd is non-zero (that is, FormerStreamEnd is a pointer to a task), then the StreamNext value associated with the task is updated to point to the newly launched tasks. If FormerStreadEnd is zero, then no tasks are pending in the TMDQ, and the new task may begin execution immediately.

The example of Table 8 executes within a critical section of operation so as to avoid deadlock where a thread has posted a task into a stream, but then the thread has been swapped out before launching the new task. In such a case, deadlock may occur if the swapped out thread is not allowed to be swapped back until the new task has completed. However, the new task may not begin execution because the new task has not yet been launched.

When a task completes, a scheduler executing on parallel processing subsystem 112 reads the last stream pointer corresponding to the TMDQ associated with the completed task. If the last task pointer 1040 of the associated TMDQ does not point to the completed task, then the completed task is not the last task in the TMDQ. In such a case, the scheduler causes the next task in the TMDQ to begin execution, as described below in conjunction with FIG. 11. If the last task pointer 1040 of the associated TMDQ points to the completed task, then the completed task is the last task in the TMDQ. In such a case, the scheduler performs an atomic compare and swap to set the last task pointer 1040 to a null pointer and read the value currently stored in the last task point 1040. The scheduler performs a function call in the form of "currentEnd=atomicCAS(&StreamEnd, finishedTask, NULL)," where "StreamEnd" is the last task pointer 1040 of the associated TMDQ, "finishedTask" is a pointer to the completed task, and "NULL" is the null pointer. The function atomically returns the value stored in the last task pointer 1040, as represented by "currentEnd" in the function call.

If the value of "currentEnd" is a pointer to the completed task, then all tasks in the TMDQ have completed, and no new task has been launched. The scheduler knows that all tasks in the stream have completed. If the value of "currentEnd" is not a pointer to the completed task, then a new task has been launched, and the thread group context 1020 has been updated to reflect the existence of the new task. In such a case, the scheduler reads the StreamNext pointer (described below) associated with the completed task. If the StreamNext pointer associated with the completed task is non-zero, then the scheduler causes the task at address StreamNext to begin execution. If the value of StreamNext is the null pointer, then a new task has been launched, but the task status has not yet been updated to reflect the existence of the new task. In such a case, the scheduler monitors StreamNext until the value changes from the null pointer to a pointer to the new task. The scheduler then causes the new task pointed to by StreamNext to begin execution.

Figure 11A:
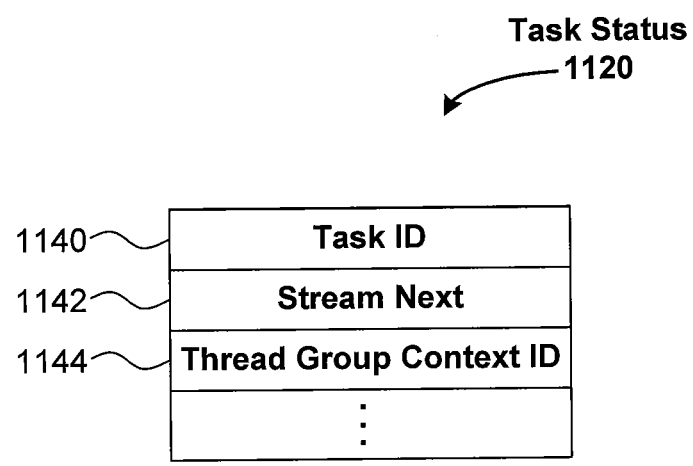
FIG. 11A illustrates a task status data structure including parameters associated with a computational task, according to one embodiment of the present invention.

FIG. 11A illustrates a task status 1120 data structure including parameters associated with a computational task, according to one embodiment of the present invention. As shown, the task status 1120 includes a task identifier (task ID) 1140, a stream next pointer 1142, a thread group context identifier (thread group context ID) 1144, and other parameters associated with the task (not shown).

The task ID 1140 is a unique identifier pointing to the task associated with the task status 1120. A task status 1120 is created for each new task as tasks are created and launched on a TMDQ. The task ID enables the scheduler to find the task associated with a given task status 1120.

The stream next pointer 1142 is a pointer to the next task in the TMDQ. When a task completes, the scheduler reads the next stream pointer to determine where to find the next task in the TMDQ that may begin execution. The scheduler then causes the task located at the address pointed to by the stream next pointer 1142 to begin execution. If the completed task is the last task in the TMDQ, then the stream next pointer 1142 is set to a null pointer.

The thread group context ID 1144 is a unique identifier pointing to the thread group context 1020 associated with the task status 1120. When a task completes, the scheduler reads the thread group context ID 1144 to find the thread group context 1020. The scheduler can then perform associated task completion steps, such as updating the work counter closing a TMDQ, and closing a context, as described above in association with FIG. 10.

Figure 11B:
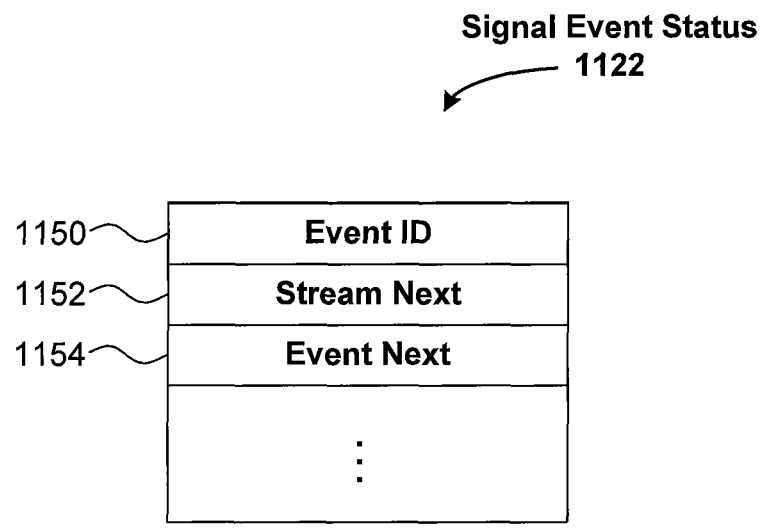
FIG. 11B illustrates a signal event status data structure including parameters associated with a signal event, according to one embodiment of the present invention.

FIG. 11B illustrates a signal event status 1122 data structure including parameters associated with a signal event, according to one embodiment of the present invention. Signal event status 1122 data structure comprises an event identifier (ID) 1150, a stream next pointer 1152 and an event next pointer 1154. Event ID 1150 uniquely identifies a particular event upon which different tasks may depend. Stream Next 1152 has substantially identical meaning and function relative to Stream Next 1142 of FIG. 11A. Event Next 1154 is a pointer to a next dependent event.

Figure 11C:
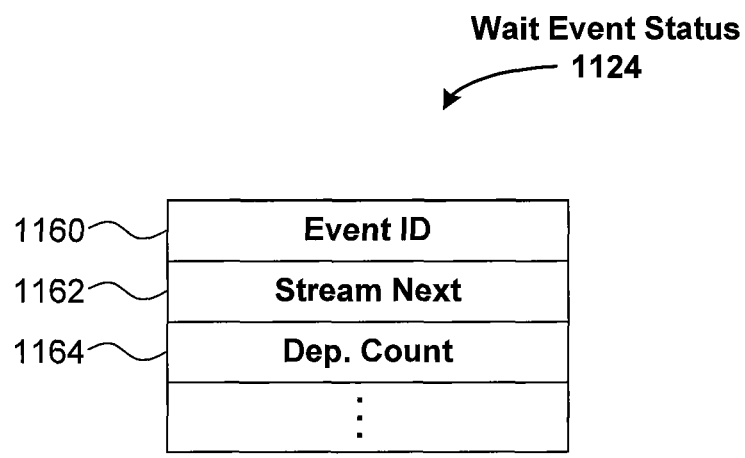
FIG. 11C illustrates a wait event status data structure including parameters associated with a computational task, according to one embodiment of the present invention.

FIG. 11C illustrates a wait event status data 1124 structure including parameters associated with a computational task, according to one embodiment of the present invention. Wait event status 1124 data structure comprises an event ID 1160, a stream next pointer 1162, and a dependency count 1164. Event ID 1160 is defined and operates substantially identically to Event ID 1150 of FIG. 11B. Stream Next 1162 is defined and operates substantially identically to Stream Next 1142 of FIG. 11A.

Task status 1120 data structure of FIG. 11A, signal event status 1122 data structure of FIG. 11B, and wait event status data 1124 structure comprise items that may be queued within a TMDQ for processing. Tasks are queued to initiate a corresponding computation, while events enforce computation ordering among a plurality of queued tasks. Certain applications have execution dependencies among different tasks that need to be satisfied before a particular task is permitted to execute.

Figure 12:
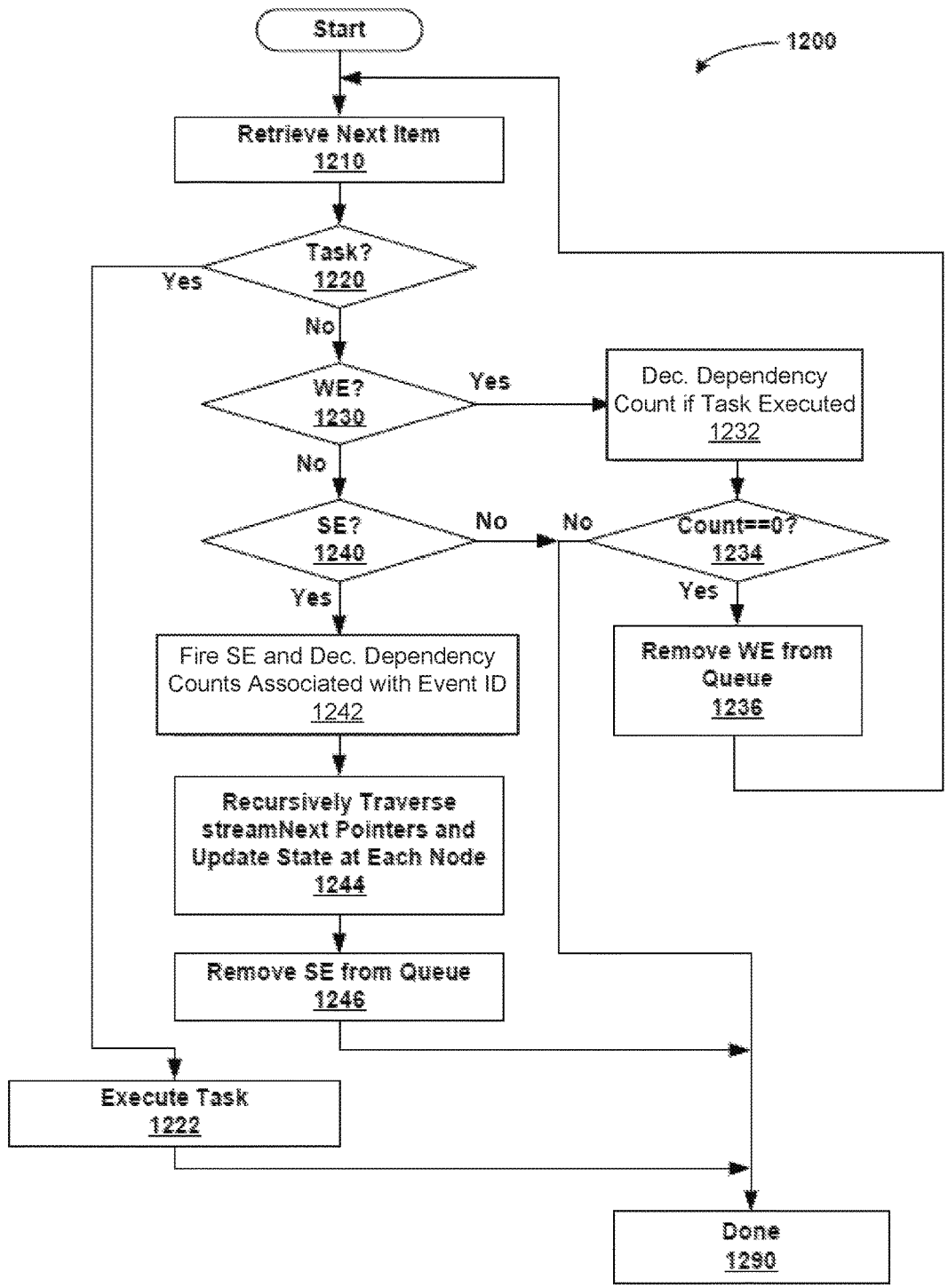
FIG. 12 is a flow diagram of method steps for determining that task execution dependencies have been satisfied, according to one embodiment of the present invention.

FIG. 12 is a flow diagram of method 1200 for determining that task execution dependencies have been satisfied, according to one embodiment of the present invention. Although the method steps are described in conjunction with the systems of FIGS. 1-4 and 6, persons of ordinary skill in the art will understand that any system configured to perform the method steps, in any order, is within the scope of the present invention.

In one embodiment, method 1200 is executed by a scheduler kernel, discussed previously in FIG. 5. The scheduler kernel executes after a task completes to determine what work should be scheduled next. Method 1200 processes an item at the front of stream task queue, such as a TMDQ, described previously.

The method begins in step 1210, where the scheduler kernel retrieves a next item from a corresponding TMDQ. In one embodiment, the next item may comprise a task metadata descriptor, a waiting event descriptor, or a signaling event descriptor. If, in step 1220, the next item is not a descriptor for a task, then the method proceeds to step 1230. If, in step 1230, the next event is not a descriptor for a waiting event, then the method proceeds to step 1240.

If, in step 1240, the next item is a signaling event, then the method proceeds to step 1242, where the signaling event is fired/executed and the scheduler kernel decrements dependency count values associated with an event ID for the signaling event. The dependency count values comprise entries within a list of related events generated by sequential calls to cudaStreamWaitEvent( ). In one embodiment, the next item comprises a signal event status data structure, such as signal event status 1122 of FIG. 11B, and the event ID is given by the signal event status data structure. The list of related events comprises a linked list of wait event status 1124 elements linked via event next pointer 1154. To decrement dependency counts associated with the event ID, the scheduler kernel traverses the list of related events and decrements dependency counts associated with wait event status 1124 element dependency count 1164 entries. After step 1242 is completed, dependency count values for waiting events immediately dependent on the event ID store decremented values. The act of decrementing a dependency count associated with a wait event may enable certain tasks to execute, or fire a cascade of additional updates. In step 1244, the scheduler thread recursively traverses StreamNext pointers, described previously, that are associated with dependently related nodes to update state at each dependently related node. Persons skilled in the art will recognize that method 1200 may be executed recursively to accomplish step 1244. Alternatively, a flattened, non-recursive traversal technique may be implemented, while performing method 1200 at each dependent node. In step 1246, the scheduler kernel removes the SE entry from the TMDQ. The method terminates in step 1290.

Returning to step 1230, if the next event is a descriptor for a waiting event, then the method proceeds to step 1232, where the scheduler kernel decrements a dependency count for the waiting event if the previous corresponding task is executed. In one embodiment, the dependency count is initialized to a value of two when the waiting event depends on both a task and a signaling event. If, in step 1234, the dependency count is equal to zero, then the method proceeds to step 1236, where the waiting event entry is removed from the TMDQ before the method proceeds back to step 1210.

Returning to step 1220, if the next item is a descriptor for a task, then the method proceeds to step 1222, where the scheduler kernel causes the task associated with the descriptor to execute. In one embodiment, the task is caused to execute within an SM 310 of FIG. 3B.

Returning to step 1240, if the next item is not a signaling event, then the method terminates in step 1290.

Returning to step 1234, if dependency count is not equal to zero, then the method terminates in step 1290.

In sum, a technique for enforcing cross stream dependencies is disclosed. The technique involves queuing waiting events to create cross stream dependencies and signaling events to indicated completion to the waiting events. The technique does not involve locking and may execute efficiently on a parallel processing subsystem such as a GPU. A scheduler kernel examines a task status data structure from a corresponding stream and updates dependency counts for tasks and events within the stream. When a dependency count reaches zero, a corresponding task or event may execute. A given thread may establish dependencies by calling cudaEventCreate( ) to create an event object, cudaStreamWaitEvent( ) to create a waiting event, and cudaEventRecord( ) to create a signaling event.

One advantage of the disclosed technique is that a GPU may correctly and efficiently enforce execution order in tasks having cross stream dependencies without intervention from a CPU. Another advantage is that a given hierarchical execution graph of tasks may be structured to be composable, thereby preserving proper execution semantics required by many general computing models. Thus, the disclosed technique advantageously, enables a general, composable execution model to be implemented on parallel processing subsystems, such as GPUs.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

What is claimed is:

1. A computer-implemented method for processing a plurality of tasks across a group of threads, the method comprising:
retrieving a first item from a first queue that stores processing tasks, wait events, and signaling events, the first queue being executed by a first thread;
determining that the first item comprises a signaling event and executing the signaling event, wherein a wait event in a second queue is dependent on the signaling event, the second queue being executed by a second thread;
in response to executing the signaling event, decrementing a dependency count associated with the wait event in the second queue; and
removing the first item from the first queue, wherein the first thread and the second thread execute within a graphics processing subsystem and at least one thread of the graphics processing subsystem generates at least one of a wait event and a signaling event stored in the first queue, wherein the graphics processing subsystem is coupled to a central processing unit (CPU) and receives processing tasks from the CPU.

2. The method of claim 1, wherein the dependency count represents a number of different other tasks or events that the wait event in the second queue is waiting for to complete before the wait event can complete.

3. The method of claim 2, further comprising recursively traversing a plurality of pointers that point to a plurality of nodes, wherein each pointer points to a different node, and each node is associated with one of the different other tasks or events.

4. The method of claim 1, wherein the wait event in the second queue is further dependent on a given task.

5. The method of claim 4, wherein the wait event in the second queue functions to block the execution of any additional task until the given task is completed.

6. The method of claim 5, wherein additional tasks reside in the second queue behind the wait event.

7. The method of claim 4, further comprising determining that the dependency count is equal to zero.

8. The method of claim 7, further comprising retrieving a second item from the first queue.

9. The method of claim 8, further comprising determining that the second item in the first queue comprises a task, and causing the task to be executed.

10. The method of claim 1, wherein:
the second queue stores processing tasks having cross dependencies with tasks stored in the first queue; and
the graphics processing subsystem manages cross dependencies between the first queue and the second queue.

11. The method of claim 10, wherein:
the graphics processing subsystem manages cross dependencies between the first queue and the second queue without intervention from the CPU.

12. The method of claim 1, wherein the graphics processing subsystem processes, via non-locking operations, the first queue and the second queue without intervention from the CPU.

13. The method of claim 1, wherein the graphics processing subsystem manages, via non-locking operations, cross dependencies between tasks of the first queue and the second queue without intervention from the CPU.

14. A non-transitory computer-readable storage medium including instructions that, when executed by a processing unit, cause the processing unit to process a plurality of tasks across a group of threads, by performing the steps of:
retrieving a first item from a first queue that stores processing tasks, wait events, and signaling events, the first queue being executed by a first thread;
determining that the first item comprises a signaling event and executing the signaling event, wherein a wait event in a second queue is dependent on the signaling event, the second queue being executed by a second thread;
in response to executing the signaling event, decrementing a dependency count associated with the wait event in the second queue; and removing the first item from the first queue, wherein the first thread and the second thread execute within a graphics processing subsystem and at least one thread of the graphics processing subsystem generates at least one of a wait event and a signaling event stored in the first queue, wherein the graphics processing subsystem is coupled to a central processing unit (CPU) and receives processing tasks from the CPU.

15. The non-transitory computer-readable storage medium of claim 14, wherein the dependency count represents a number of different other tasks or events that the wait event in the second queue is waiting for to complete before the wait event can complete.

16. The non-transitory computer-readable storage medium of claim 15, further comprising recursively traversing a plurality of pointers that point to a plurality of nodes, wherein each pointer points to a different node, and each node is associated with one of the different other tasks or events.

17. The non-transitory computer-readable storage medium of claim 14, wherein the wait event in the second queue is further dependent on a given task.

18. The non-transitory computer-readable storage medium of claim 17, wherein the wait event in the second queue functions to block the execution of any additional task until the given task is completed.

19. The non-transitory computer-readable storage medium of claim 18, wherein additional tasks reside in the second queue behind the wait event.

20. The non-transitory computer-readable storage medium of claim 17, further comprising determining that the dependency count is equal to zero.

21. The non-transitory computer-readable storage medium of claim 20, further comprising retrieving a second item from the first queue.

22. The non-transitory computer-readable storage medium of claim 21, further comprising determining that the second item in the first queue comprises a task, and causing the task to be executed.

23. A computing device, comprising:
a central processing unit; and
a parallel processing subunit coupled to the central processing unit, comprising:
a graphics processing subsystem that includes a streaming multiprocessor configured to:
retrieve a first item from a first queue that stores processing tasks, wait events, and signaling events, the first queue being executed by a first thread;
determine that the first item comprises a signaling event and executing the signaling event, wherein a wait event in a second queue is dependent on the signaling event, the second queue being executed by a second thread;
in response to executing the signaling event, decrementing a dependency count associated with the wait event in the second queue; and
remove the first item from the first queue, wherein the first thread and the second thread execute within the graphics processing subsystem and at least one thread of the graphics processing subsystem generates at least one of a wait event and a signaling event stored in the first queue, wherein the graphics processing subsystem is coupled to the central processing unit (CPU) and receives processing tasks from the CPU.

* * * * *